Figure 1:
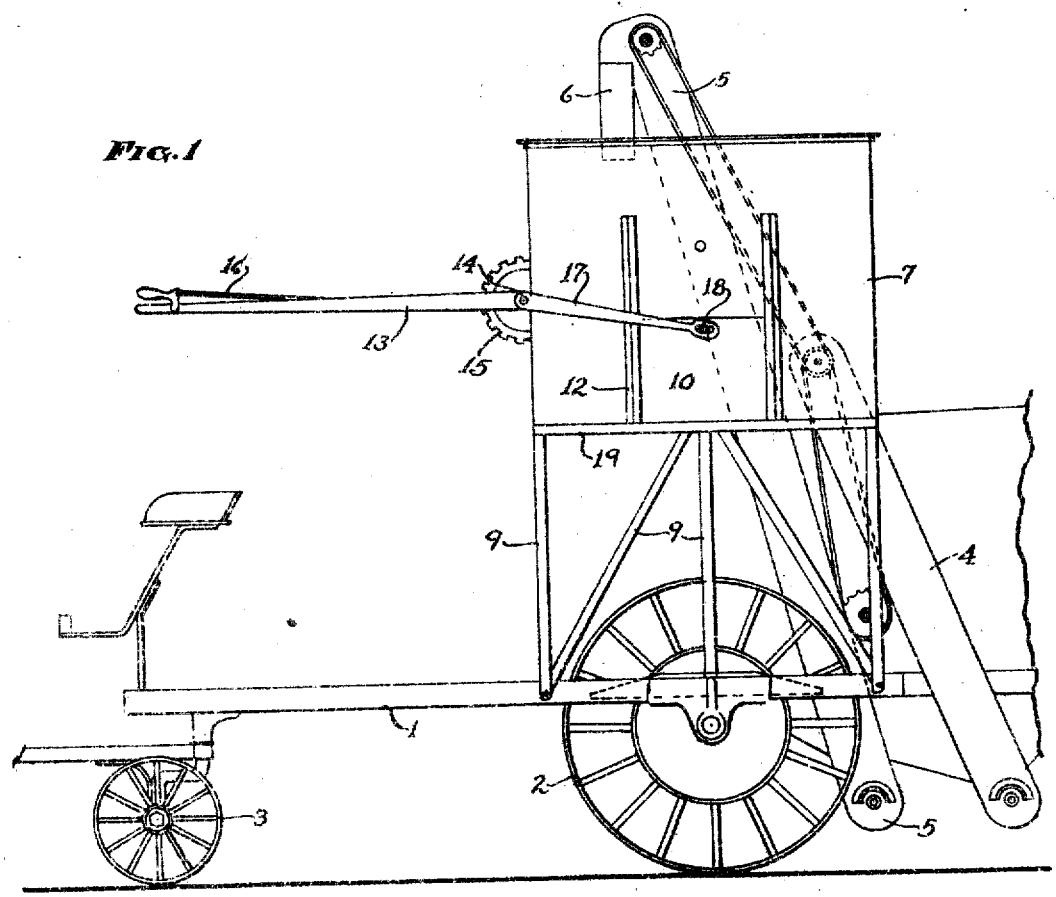

O. B. HALL.
GRAIN CARRIER.
APPLICATION FILED AUG. 1, 1921.

1,423,609.

Patented July 25, 1922.
3 SHEETS—SHEET 1.

INVENTOR.
Orrin B. Hall
BY
U. G. Charles
ATTORNEY.

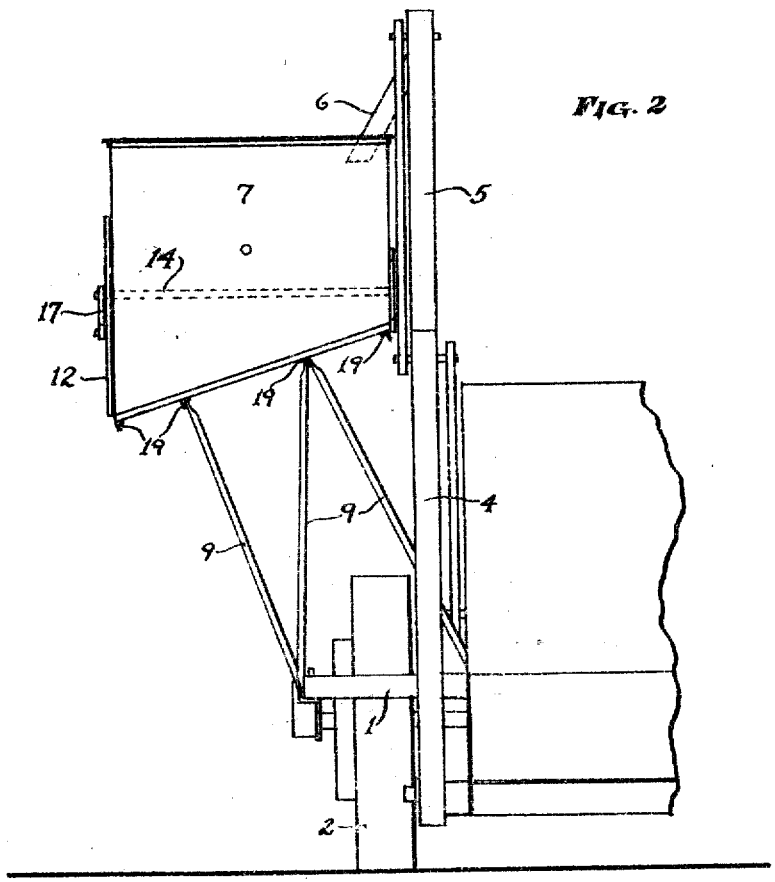

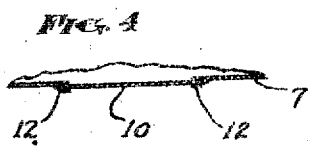
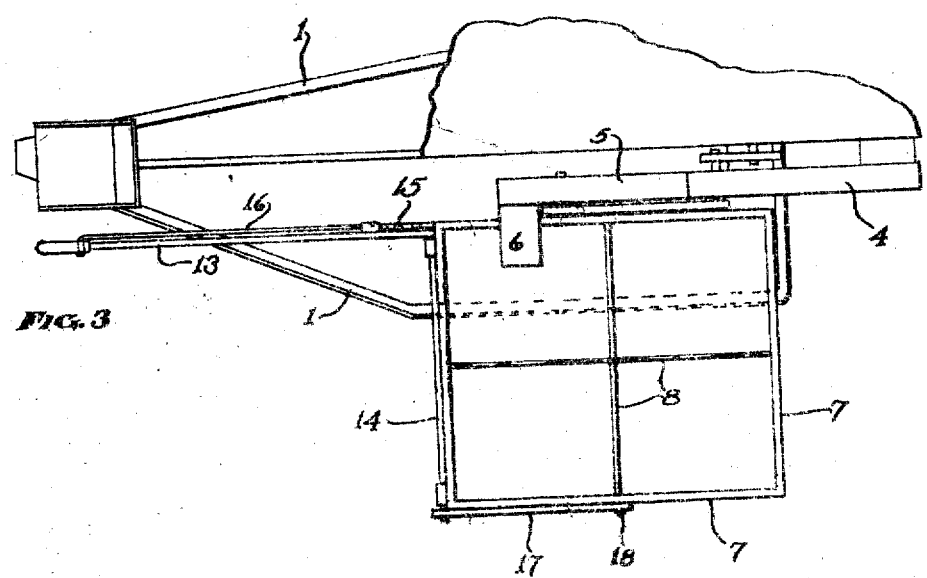

UNITED STATES PATENT OFFICE.

ORRIN B. HALL, OF OATVILLE, KANSAS.

GRAIN CARRIER.

1,423,609.

Specification of Letters Patent.  Patented July 25, 1922.

Application filed August 1, 1921. Serial No. 488,920.

*To all whom it may concern:*

Be it known that I, ORRIN B. HALL, a citizen of the United States, residing at Oatville, in the county of Sedgwick and State of Kansas, have invented certain new and useful Improvements in Grain Carriers, of which the following is a specification, reference being had to the drawings forming a part hereof.

My invention relates to an attachment for combined grain harvesters and separators, which machines are well known and in extensive use. The object of my invention is to save time and labor in delivering the grain from the separator to the elevator, railway car or other destination.

The type of machine above referred to comprises in its construction a large bullwheel located on the elevator side. Without using my invention, the present practice in delivering the threshed grain without an intermediate sacking, is, either to drive a wagon alongside the separator to receive the grain from a spout, or, to tie a wagon to the separator frame for the same purpose; thus loading the wagon while the harvester progresses through the field. Both of these methods are attended by serious inconvenience and loss of time. When a wagon is tied to and carried along by the machine, the side draft thereof causes the machine constantly to swerve to one side.

My improvement comprises as an attachment, an elevated grain-tank (carrier) of a capacity equal to that of a large wagon or truck, mounted upon the frame of the thresher directly above, or as nearly so as possible, the bull-wheel, in combination with an upwardly-extended elevator arranged for conveying the grain from the separator up into the tank, which has a normally closed outlet suitably located for discharging into a truck or wagon. This device as tested by me does not cause any lateral pull upon the machine carrying wheels, and it dispenses with the labor of driving a truck or wagon along side, or of tying a wagon to the machine and detaching it therefrom.

Referring now to the accompanying drawings:

Fig. 1 is a side elevation of the frame and ground-wheels of a combined separator, omitting the harvester portion, as equipped with a grain carrier embodying the invention; Fig. 2 is a rear elevation of the same, omitting a part of the separating machine; Fig. 3 is a top plan view, and Fig. 4 is a sectional detail taken horizontally through the gate of the carrier.

1 designates the sills of the frame of a thresher or separator of the type herein referred to; 3 and 2, the carrying wheels thereof; 4, the tailings elevator. I have omitted the harvesting part of the machine, as a showing thereof would add nothing to a disclosure of the invention.

7 designates a tank, which may be constructed of wood or metal and in any preferred form, being as shown, rectangular, comprising side walls, a bottom, and no top. This tank is supported by suitably arranged iron bars 9 which are secured at various points to the frame 1 as shown, or in any preferred manner. The bottom of the tank is provided with several exterior angle-bars 19, to certain of which the upper ends of the supporting braces 9 are secured. As viewed from the side, the tank is located directly over the bull-wheel 2. As seen from the front or rear, the tank is projected outwardly as shown, so as to discharge into the center of a receiving-truck or wagon. The bottom of the tank is inclined for this purpose.

The elevator marked 5 is the usual delivery elevator, extended upwardly as shown to a point above the top of the tank for discharging thereinto, through a spout 6.

The outer wall of the tank is provided with a large outlet opening (not shown) normally kept closed by a gate.

The type of gate employed is almost immaterial; the gate shown herein at 10 is vertically slidable between guides formed by a pair of Z bars 12, secured to the tank wall. For most convenient opening and closing of this gate, I prefer to employ a cord and pulleys or a lever arrangement as shown on Fig. 1, in which a rock-arm 17 and a hand-lever 13 are mounted on a rock-shaft 14. A slot in arm 17 receives a pin 18 projected from the gate 10. The lever 13 extends toward the driver's seat to within the driver's reach, and is held at any desired angle by a latch 16 engaging a notched quadrant 15 on the tank.

Operation: As the harvesting machine, which is carried upon the frame 1, travels through a field, the elevator 5 will be driven with the threshing elements and will deliver grain into the carrier 7. A motor truck or a wagon meets this machine at a point where the carrier 7 is filled, the driver opens the gate 10, and the carrier empties into the truck or wagon, which takes the load to destination. Immediately the gate is reclosed, the machine proceeds with the cutting and threshing.

My improvement is very desirable in all cases where the grain is taken away from the separator in bulk, unsacked.

Having thus described my invention, I claim, and desire to secure by Letters Patent:

1. In combination with a combined grain harvester and separator including a framework, elevator and bull wheel; a grain tank arranged beneath the outlet of said elevator and supported above the bull wheel by frame elements; a downwardly and outwardly sloping floor for said tank, and a gate, normally closed, arranged in the outer wall of said tank in a plane parallel to but beyond the plane of the outer face of the bull wheel.

2. In combination with a combined grain harvester and separator including a framework, elevator and bull wheel; a grain tank arranged beneath the outlet of said elevator and supported by frame elements above the bull wheel; a downwardly and outwardly sloping floor for said tank; a gate, slidably arranged in guides secured on the outer side face of and for closing an opening into said tank; a rock shaft on said tank, a hand lever and a slotted rock arm operable thereby on said shaft, a pin on said gate engaged with the slot of said arm and means for securing said lever in desired positions for maintaining the gate in selected positions and in a plane parallel to but beyond the plane of the outer face of the bull wheel.

ORRIN B. HALL.

Attest:
M. Y. CHARLES,
J. R. HALL.